UNITED STATES PATENT OFFICE.

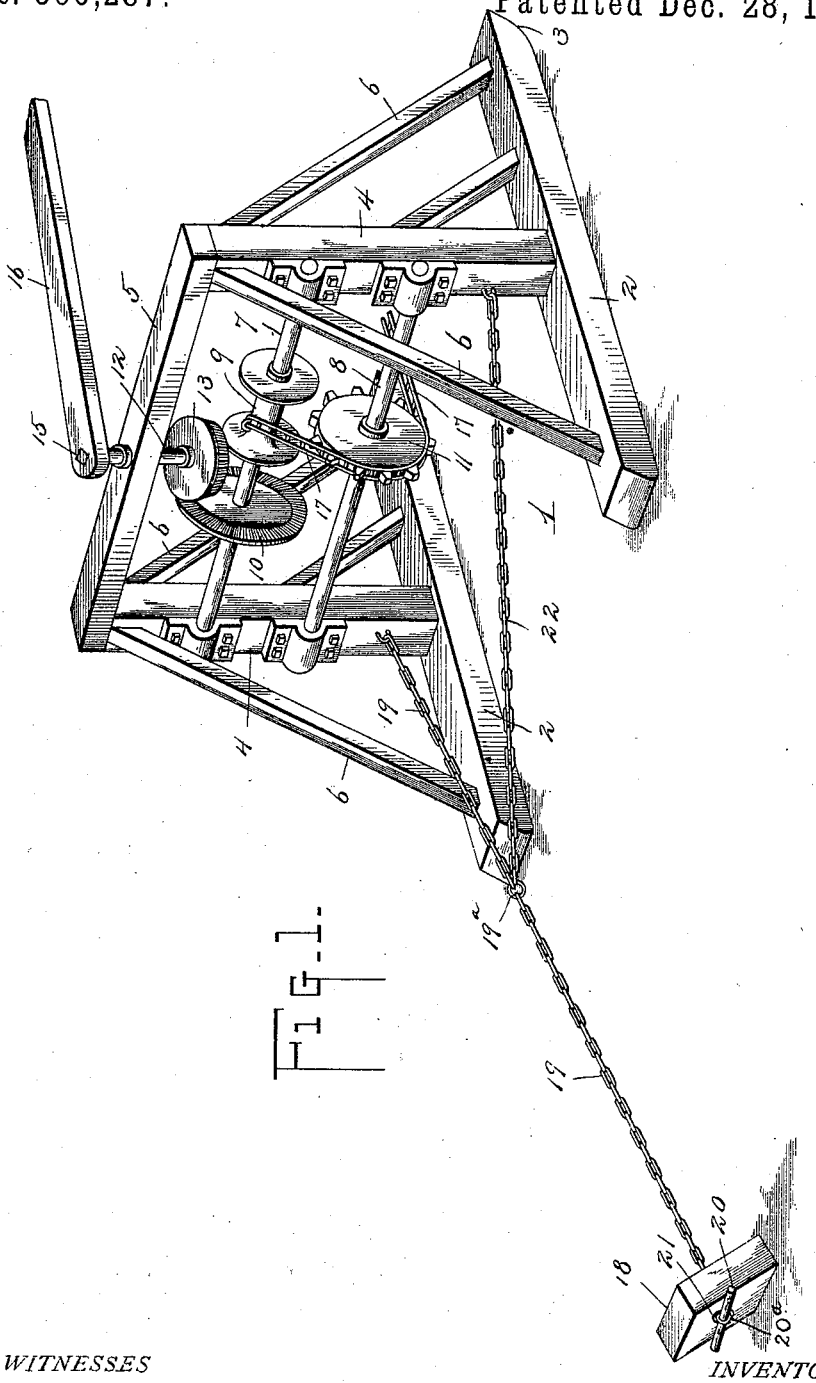

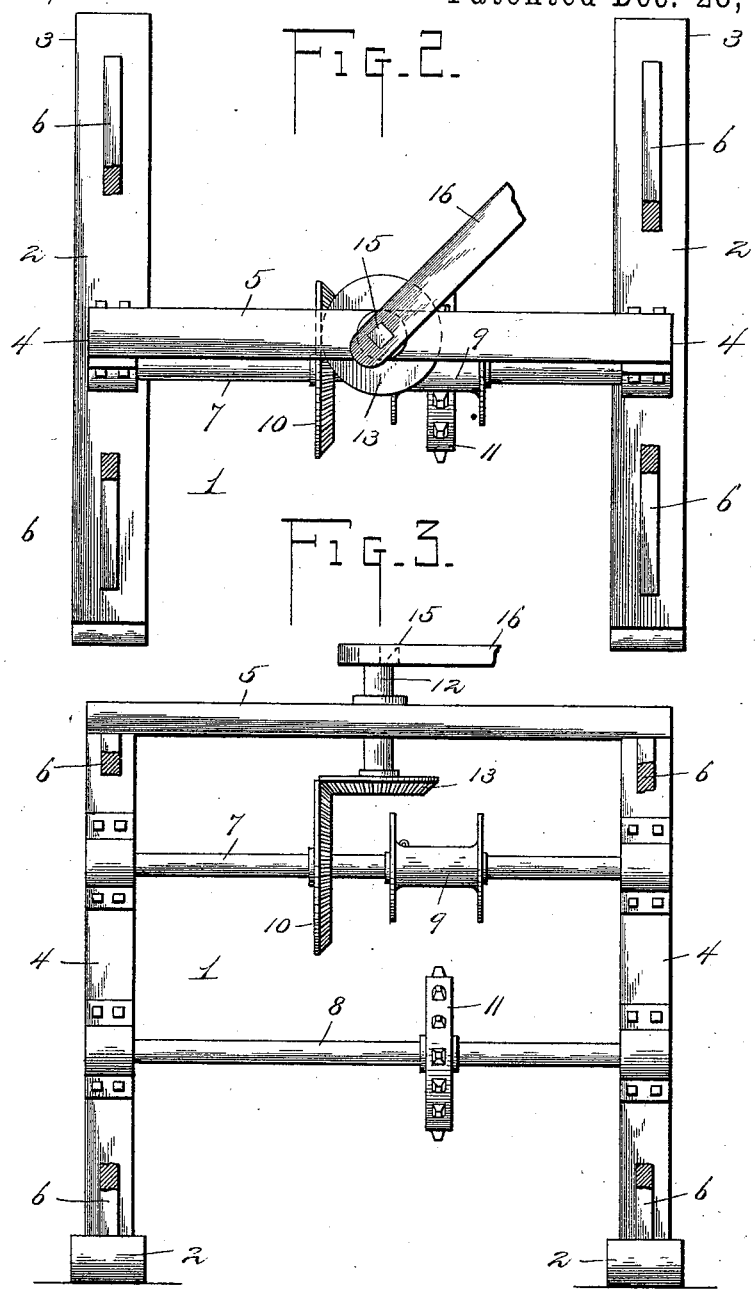

WALTER MITCHELL, OF ST. PAUL, MINNESOTA.

STUMP-PULLER.

SPECIFICATION forming part of Letters Patent No. 596,287, dated December 28, 1897.

Application filed March 10, 1897. Serial No. 626,722. (No model.)

*To all whom it may concern:*

Be it known that I, WALTER MITCHELL, a citizen of the United States, residing at St. Paul, in the county of Ramsey and State of Minnesota, have invented certain new and useful Improvements in Stump-Pullers; and I do hereby declare the following to be a full, clear, and exact description of the invention, such as will enable others skilled in the art to which it appertains to make and use the same.

My invention relates to certain new and useful improvements in stump-pullers for extracting stumps, roots, and the like from the ground; and its object is to provide a device of simple construction which may be transported from place to place where the work is being done.

To this end my invention consists in certain novel constructions, combinations, and arrangements of parts in a device of the class specified, as will be hereinafter more fully described, and specifically set forth in the appended claim.

In the accompanying drawings, Figure 1 is a perspective view of a stump-puller constructed in accordance with my invention. Fig. 2 is a top or plan view, and Fig. 3 an end view of the same.

Like numerals designate like parts throughout the several figures of the drawings.

Referring to the drawings, the numeral 1 designates the stump-puller, which comprises two spaced parallel sills or runners 2, which have their front ends curved at 3 in order that the device may move without obstruction over the ground. Two vertical standards 4 rise from said sills and are connected by a cross-bar 5. Braces 6 connect the sills and standards.

Two horizontal or cross shafts 7 8 extend across and are journaled in the two vertical standards, and the upper shaft is provided with a drum 9 and a beveled gear 10, and the lower shaft 8 is provided with a sprocket-wheel 11.

A vertical drive-shaft 12 extends through the cross-bar 5 and carries at its lower end a beveled gear 13, which meshes with the said beveled gear 10 on the upper shaft and imparts motion thereto. The upper end of this vertical drive-shaft carries a rectangular-shaped head 15, to which is secured the inner end of a pole or tongue 16. In the operation of the device one or more horses are attached to the said pole and driven in a circle around the machine, whereby motion is imparted to the said shafts and gearings. The chain 17 is attached to the drum 9 and passes over the sprocket-wheel 11 on the lower cross-shaft, and the free end of this chain is adapted to be connected with the stump or root which is to be pulled out of the ground.

The numeral 18 designates an anchor-post, which is to be burried in the ground where the work is being done in order to hold the stump-puller stationary. An anchor-chain 19 is connected at one end with the standard 4 and is provided at the center with a ring 19$^a$ and at its outer end with another ring 20$^a$. The said outer end of the chain is adapted to extend through a socket or opening 21 in the anchor-post, and is confined by a pin 20 passing through said ring. By this construction the anchor-chain may be readily and conveniently connected with and disconnected from the anchor-post. A short stretch of chain 22 is secured at one end to the other standard 4, and at its other end to the ring 19$^a$ of the chain 19.

My invention provides a simple and effective construction of stump-puller, which may be readily and conveniently transported from place to place and may be manufactured at a comparatively small cost.

Having thus described the invention, what is claimed as new, and desired to be secured by Letters Patent, is—

A stump-puller comprising a frame comprising a pair of vertical standards mounted on sills or runners and a cross-bar connecting said standards, a transverse shaft 7 mounted in bearings in said standards, a gear and a winding-drum on said shaft, a second transverse shaft mounted in bearings in said standards in a vertical line below the shaft first named, a sprocket-wheel thereon, a chain having one end made fast to the drum and passing around the said sprocket-wheel and the opposite end thereof adapted for engagement with a stump, a vertical shaft having bearings in the cross-bar of the frame, a gear provided at the lower end of said shaft and meshing with the gear-wheel on the drum-shaft, a pole or tongue connected with the upper end of said vertical drive-shaft, an anchor-post adapted to be buried in the ground and provided with a socket or opening, a main anchor-chain having one end connected with one of the standards and the other end thereof formed with a loop or eye adapted to be passed through the said socket or opening in the anchor, a removable pin passing through the said loop or eye and securing the chain to the anchor-post, and a short or auxiliary anchor-chain section connected at one end with the main anchor-chain and at the other end with the other standard, substantially as described.

In testimony whereof I have signed this specification in the presence of two subscribing witnesses.

WALTER MITCHELL.

Witnesses:
OSCAR HALLAM,
RENVILLE CHINNOCK.